United States Patent [19]
Ackermann et al.

[11] Patent Number: 4,825,516
[45] Date of Patent: May 2, 1989

[54] SNAP FASTENER CONSTRUCTION

[75] Inventors: Walter T. Ackermann, Watertown; Clark A. Denslow, Wilton, both of Conn.

[73] Assignee: A-D Technology Ltd., Watertown, Conn.

[21] Appl. No.: 176,850

[22] Filed: Apr. 4, 1988

Related U.S. Application Data

[63] Continuation-in-part of Ser. No. 889,880, Jul. 28, 1986, Pat. No. 4,735,753.

[51] Int. Cl.⁴ .................................... A44B 1/04
[52] U.S. Cl. .................................. 24/693; 24/90 C; 24/465
[58] Field of Search ............... 24/693, 459, 460, 462, 24/464, 465, 473, 474, 586, 686, 688, 265 R, 90 C, 90 HA, 682

[56] References Cited

U.S. PATENT DOCUMENTS

| 62,848 | 3/1867 | Hill | 24/682 |
|---|---|---|---|
| 912,718 | 2/1909 | McCafferty | 24/90 C |
| 1,492,361 | 4/1924 | Davy | 24/465 X |
| 1,918,494 | 7/1933 | Scott | 24/473 |
| 2,041,498 | 5/1936 | Swidersky | 24/459 |
| 2,111,664 | 3/1938 | Gross | 24/90 C |
| 2,121,513 | 6/1938 | Smith | 24/90 C |

FOREIGN PATENT DOCUMENTS 1018365 10/1957 Fed. Rep. of Germany ........ 24/693

Primary Examiner—Kenneth J. Dorner
Assistant Examiner—Laurie K. Cranmer
Attorney, Agent, or Firm—Hopgood, Calimafde, Kalil, Blaustein & Judlowe

[57] ABSTRACT

First and second complementary snap-fastener components locally and in-situ molded to the same side of a single flexible porous substrate and at relatively short spacing from each other, such that the substrate can be folded between these complementary components to permit their selective mutual engagement and disengagement. One of these formations is a stud component and the other is a socket component, and the sizing of their engageable formations is such that a predetermined clearance characterizes a loose fit when in mutually engaged relation. The looseness of this fit bears a predetermined relation to the thickness and flexible deformability of another flexible member or tie element which is interposed between the snap-fastener elements to secure a given selected location of snap-fastener retention to the tie element. Several embodiments are described.

11 Claims, 2 Drawing Sheets

SNAP FASTENER CONSTRUCTION

BACKGROUND OF THE INVENTION

This application is a continuation-in-part of original patent application, Ser. No. 889,880, filed July 28, 1986, the disclosure of which is hereby incorporated by reference.

Said original patent application discloses individual precision formation of a stud component and of a socket component of a snap-fastener combination, wherein each of the components is in situ formed to porous substrate material and from a single charge of plastic material, and wherein the plastic material of the charge extends void-free and integrally through and solidly impregnates the pores of the substrate at the substrate locality of in situ formation. In said disclosure, the formed snap-fastener components were discussed in the context of one component (e.g., the stud) and the other component (e.g., the socket) being formed to different substrates, as for later selective removable attachment of the two substrates, or in the context of these components being formed to spaced locales of a single substrate, wherein the spaced locales of the single substrate are to be selectively engaged and disengaged.

A limitation of such constructions and arrangements is that the involved stud and socket components must be precision-formed for predetermined snap-engageability to and disengageability from each other. An adjustably completed garment closure with such components is not possible without either having a single stud component selectively engageable to one of a plurality of spaced socket components, or having a single socket component selectively engageable to one of a plurality of spaced stud components. But to resort to such measures (a) involves the expense of forming more components than will ever be used for a given customer purpose and (b) the degree of adjustability as to completed engagement is necessarily only characterized by stepped increments determined by the spacing of like components.

BRIEF STATEMENT OF THE INVENTION

It is an object of the invention to provide in-situ molded snap-engageable structural arrangements wherein the range of separably engaged fastening of two flexible substrates or of two spaced locations on a single substrate is infinitely accommodated, without imposing stepped increment limitations on the fastened relationship.

Another object is to achieve the foregoing object without requiring multiple-production of identical spaced fastening components on the same substrate.

A further object is to achieve the above objects in a formed structural relationship such that the removable snap engagement is assisted by self-piloting alignment of engageable components.

The invention achieves these objects by forming first and second complementary snap-fastener components locally and in-situ molded to the same side of a single flexible porous substrate and at relatively short spacing from each other, such that the substrate can be folded between these complementary components to permit their selective mutual engagement and disengagement. One of these formations is a stud component and the other is a socket component, and the sizing of their engageable formations is such that a predetermined clearance characterizes a loose fit when in mutually engaged relation. The looseness of this fit bears a predetermined relation to the thickness and flexible deformability of another flexible member or tie element which is interposed between the snap-fastener elements to secure a given selected location of snap-fastener retention to the tie element. Several embodiments are described.

DETAILED DESCRIPTION

Figure 1:
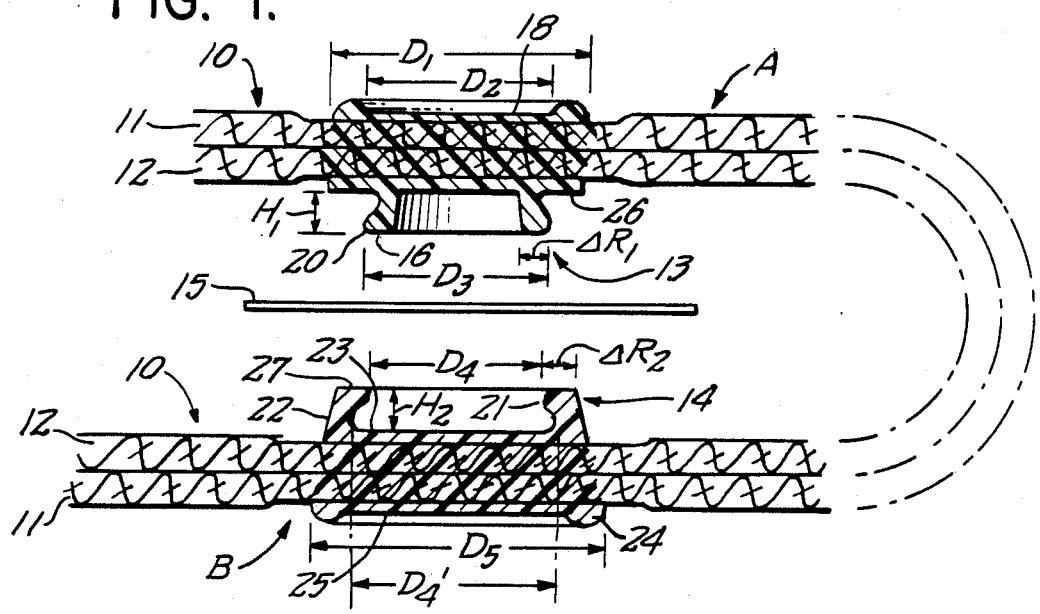
Figure 5:
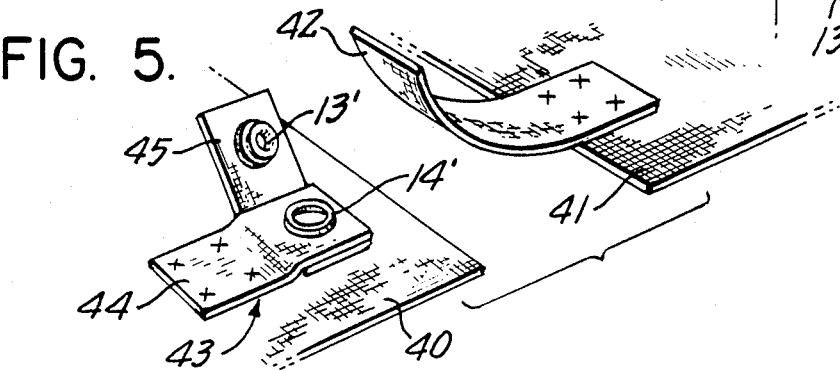
Figure 1A:
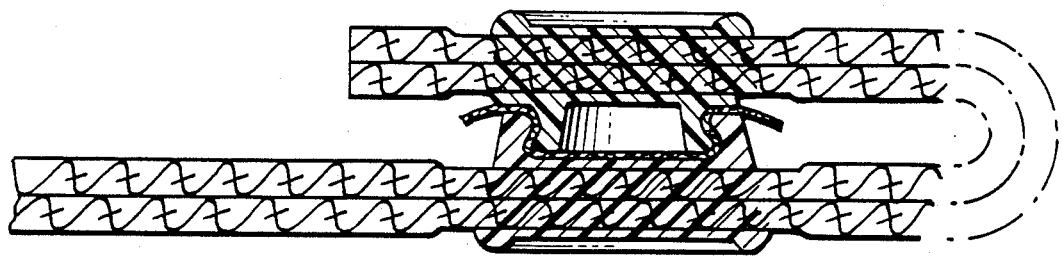
Figure 5A:
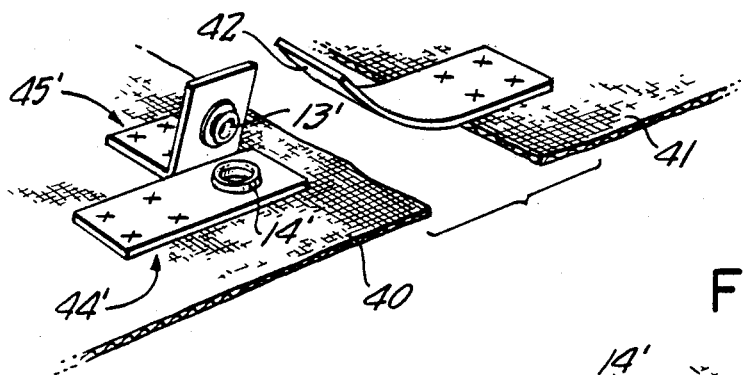
Figure 6:
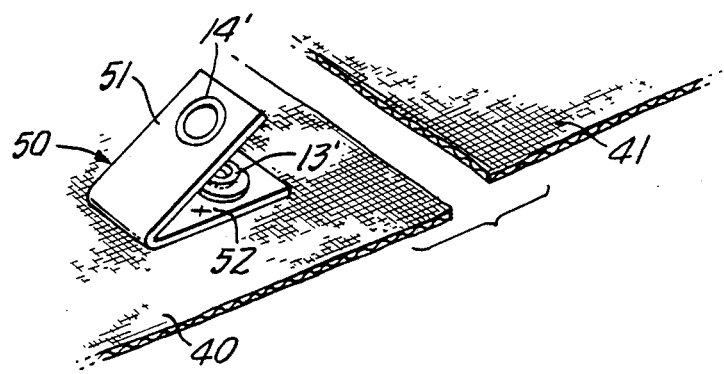
Figure 7:
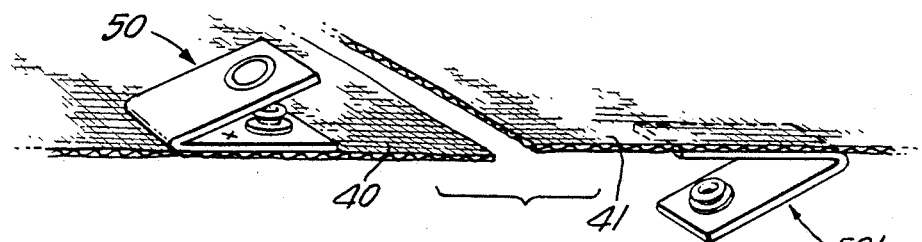
Figure 7A:
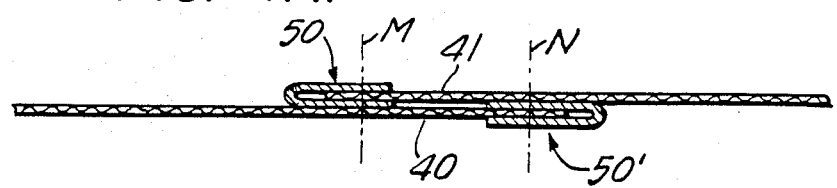

The invention will be described in detail in connection with the accompanying drawings, in which:

FIG. 1 is an enlarged sectional view of stud and socket snap-fastener components of the invention, in spaced relation to each other, prior to their mutual engagement interposed tie element;

FIG. 1A a similar view of the same components in engaged relation to each other via the interposed tie element;

FIGS. 2, 3, 4, 5, 5A and 6 are fragmentary views in perspective, to illustrate various embodiments and modifications; and FIGS. 7 and 7A are sectional views through garment edges, before and after their mutual connection via further snap-fastener components of the invention.

In FIG. 1, a single piece 10 of flexible porous substrate material is illustratively shown to comprise two plies 11–12 of fabric and to be folded back on itself near one of its ends. For convenience, the folded end will be referred to as tab portion A, and the unfolded and lapped closely spaced nearby substrate material will be referred to as body portion B. A stud formation 13 is of suitable plastic material, molded in-situ to and through the pores of both plies of the tab portion A of the substrate, which is not necessarily a woven fabric but which, for strength may be a single-ply material folded to double thickness at the stud molding 13. A socket formation 14 is also of suitable plastic material molded in-situ to and through the pores of both plies of the body portion B of the substrate. It will be understood that the stud and socket formations 13–14 are desirably formed when the substrate material lies flat, i.e., prior to folding, and that both these formations are formed on the same side of the substrate, here shown as the side of ply 12. As will later be more fully explained, the stud and socket formations 13–14 are loosely engageable, the looseness being characterized by a predetermined clearance or radial play when these parts alone are in engaged relation. However, as seen in FIG. 1A, when they are engaged to each other via an interposed strip 15 of flexible tie or strap material, of compressible thickness that is coordinated with the predetermined clearance of the loose engagement, a secure and infinitely variable tie span is achieved as between garment or wrapping edges to be secured to each other.

The method and apparatus for achieving formations 13–14, each from a single predetermined charge of suitable plastic material, are described in detail in said original patent application Ser. No. 889,880, which has been incorporated herein by reference, in order to simplify present description. It suffices for present purposes to state that the main body of stud formation 13 is that region which lies within an outer diameter $D_1$ and in which the plastic material of formation 13 has fully impregnated all voids of the substrate and has become a solid integrated component of the substrate. The stud itself is shown as a relatively thin stubby annulus 16, rising to an extent H, above a relatively thin base plastic layer 17 which locally covers the substrate face of ply 12 to which stud 16 is applied. At the other face of the substrate (i.e., of the other ply 11), a similar relatively thin base layer 18 of plastic covers the substrate but in the form shown is peripherally integrated with and reinforced by a shallow circumferentially continuous and rounded outer rim 19, of inner diameter $D_2$.

The stud annulus 16 is characterized by a circumferentially continuous convex bulbous and bead-like outer contour 20, and its radial thickness $\Delta R_1$, in the context of elastic properties of the involved plastic material, is such as to provide the stud annulus 16 with a degree of relatively stiffly but smoothly compliant local deformability, in the course of snap-on/snap-off transient interference coaction with the socket formation 14, but only for the condition of effecting such engagement via a selected local area of an interposed tie strap 15. For such coaction purposes, the outer diameter $D_3$ of the stud annulus preferably only slightly exceeds the throat diameter $D_4$ of the radially inward bead-like contour 21 of a relatively thin stubby annulus 22 of the socket part 14; stated in other words, the diameter $D_3$ of the stud annulus is less than the maximum diameter $D_4'$ of the socket cavity volume, thereby assuring the predetermined clearance or radial-play relationship which has been mentioned above. The socket annulus 22 rises to the extent $H_2$ above the relatively thin base layer 23 of plastic locally covering the substrate face to which socket 14 is applied.

Preferably, $H_1$ is so substantially equal to or slightly less than $H_2$ that, when stud 13 is engaged to socket 14 via the interposed tie strip 15, a flat flangelike surface 26 ringing the base of the stud annulus 20 will have circumferentially continuous compliantly clamped seating engagement (via tie strip 15) with a flat land surface 27, which is the upper limit of the socket formation 14. Preferably also, the effective radial thickness $\Delta R_2$ of the socket annulus 22 is such, in the context of the involved molded-plastic material and the involved material of strip 15, that a degree of stiffly compliant deformability is realized in the course of snap-on/snap-off coaction with stud formation 13, via strip 15.

As in the case of stud 13 integration with substrate 10, socket 14 is integrated by solid impregnation through all pores of the same substrate 10, within an outer diameter $D_5$, which is comparable with outer diameter $D_1$ of the stud formation. And a circumferentially continuous and rounded outer rim 24 rings the thin base layer 25 which locally covers substrate material within rim 24. Marginally compressed substrate material, peripherally surrounding each visible part of each plastic formation (13, 14), will be understood as a schematic suggestion of the compressive action of clamped opposing dies used in the in-situ molding process, as described in my said original patent application.

Figure 2:
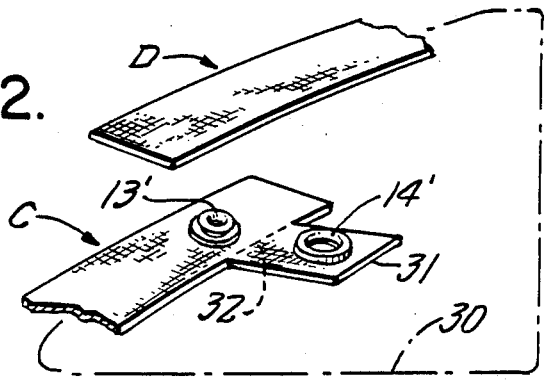

FIG. 2 depicts application of the invention to the respective ends C-D of an elongate tie member or belt 30, which may be a single continuous strip of porous substrate material; alternatively, one or both of the ends C-D may be separate end pieces which are secured to some other belt material. In any event, the end C is the only portion of the article which need be of the flexible and porous nature indicated, for in-situ molded reception of closely spaced stud (13') and socket (14') formations, of the nature described in connection with FIG. 1. As shown, the substrate end portion C includes an integral laterally offset tab 31 which is foldable on a longitudinal alignment 32, thereby providing piloted preliminary confronting registration of fastener components 13'-14', even when the other end portion D is interposed therebetween. It will be appreciated that snap-engagement of components 13'-14' via interposed end portion D is effected when one is satisfied as to the desired tightness or looseness of belt (30) envelopment of a body or other part, with a correspondingly adjusted longitudinal overlap of end portion D over end portion C, i.e., beyond overlap of the region of engageability by fasteners 13'-14'.

Figure 3:
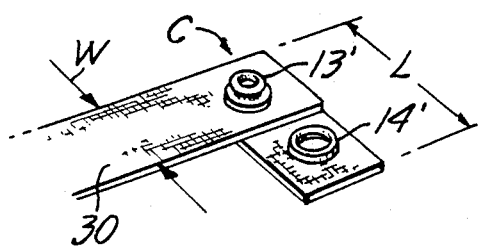

FIG. 3 shows a modification of the end portion C of the porous flexible substrate material of FIG. 2. In this modification the tab 33 is merely a short cutoff piece of porous flexible substrate material, of length L which is approximately twice the width W of the substrate strip material. Half of the material of the short cut-off piece is lapped to the underside of the end C of substrate 30 and will be firmly anchored thereto by in-situ molding the fastener component 13' to the region of overlap of porous substrates 30-33. The other fastener component 14' is in-situ molded only to the laterally offset tab portion 33 of the cutoff piece.

Figure 4:
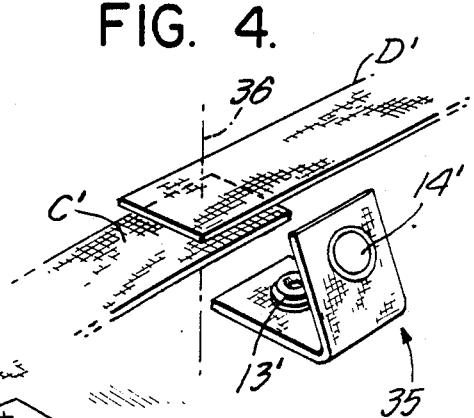

In the arrangement of FIG. 4, the short cut-off piece 35 of porous flexible substrate material is the only substrate, and it features both of the fastener components 13'-14' integrally molded thereto. Two end strips C'-D' of flexible belt or strap material are first lapped for desired wrapping tightness or looseness, and are then secured together by sidewise straddling of the lapped end portions by piece 35, being then secured additionally to and by the fastener components 13'-14', when snap-engaged over both portions C'-D', as on the alignment 36 of the engaged components.

In the arrangement of FIG. 5, opposed edge regions 40-41 of a garment or other two-dimensional flexible material are selectively and adjustably drawn together and securable by engagement of snap-fastener components 13'-14' (mounted to end region 40) over an adjustably lapped tie strap 42 (mounted to end region 41). Strap 42 may be anchored at one end to edge region 41, as by thermal tacking suggested by "x" markings, and a prefabricated snap-fastening unit 43 may be similarly anchored to edge region 40, by a similarly illustrated technique. The unit 43 is seen to comprise like short cut-off lengths 44-45 of the same porous flexible substrate material. One end of length 44 is lapped at 90 degrees to one end of the length 45, at the time when snap-fastener component 14' is in-situ molded to the lapped region, thereby permanently securing parts 44-45 together in desired orientation. The other snap-fastener component is in-situ molded to the free foldable unlapped end of substrate length 45.

In the arrangement of FIG. 5A, the short cut-off lengths 44'-45' may be of the same porous flexible substrate material, but they are separately secured to the garment end region 40 and are not secured to each other. Each of the lengths 44'-45' is complete with its in-situ molded fastener component 13'-14' prior to individual assembly to the end region 40, and it will be understood that such assembly can be accomplished with such precision of simultaneously securing both lengths 44'-45' in their correct 90°-related aspects as to facilitate unambiguous snap-fastener engagement to and adjusted interposition of tie strap 42.

FIG. 6 illustrates another embodiment wherein the same, but more elongate length 50 of substrate is formed at its respective ends 51-52 with the respective snap-fastener components and is then folded at a hinge crease at sufficient offset from the snap-fastener formations that an adequate area (marked by x's) is available for securing the body half (52) thereof to the end region 40 of garment material. The garment may be of disposable nature and sufficiently pliable that snap-fasteners 13'-14' can adjustably accommodate insertion and secure engagement of the other end region 41 of the garment material, i.e., without requiring the strap or tie 42 of FIGS. 5 and 5A.

In the arrangement of FIGS. 7 and 7A, a snap-fastener assembly 50 as described in FIG. 6 is secured to the upper face of the garment end 40, and a similar fastener assembly 50' is similarly secured to the lower face of the garment end 41. Each fastener assembly is thus individually and adjustably engageable to the free edge of the opposed garment end, all as shown for the secured relation of FIG. 7A, wherein, for simplified showing, alignment M designates the axis of fastener 50 attachment to end 41, and alignment N designates the axis of fastener 50' attachment to end 40.

It has been indicated above that self-piloting alignment of engageable components is a desirable feature of the invention. This objective is realized by so stiffly constituting the material of the substrate to which each fastener component is formed that the said substrate becomes a hinge with a recognizably accurate creased hinge axis at the fold between the tab portion A and body portion B. Such stiffening and creasing can be achieved by starching and pressing the tab and body substrate after components 13-14 have been formed to and embedded in the substrate; alternatively and illustratively, if the substrate includes a light thermoplastic coating at the interface between plies 11-12, the stiffening and creasing can be achieved by hot-pressing after the components 13-14 have been formed to and embedded in the substrate. The preference for such stiffening and hinge-creasing cannot be brought out in the scale and nature of FIG. 1, but it will be understood that the literally flat tab formations in all other drawings are each illustrative of such preference.

It will be seen that the described invention meets all stated objects. In particular, infinite variety of adjusted connection is possible between sides of an opening to be closed, or for circumferential wrapping of a part of the body. The close spacing of stud and socket components, and/or the suitably stiffened and hinge-creased relation of body and tab halves, enables a degree of automated targeting of alignment of these components for secure and quickly established connection to an adjusted tie strip or the like. Further, in the case of short-length snap-fastener preassemblies, as at 43, 44', 45' and 50, the nature and location of their attachment to garment material is such as to permit finger-insertion beneath the material of the unsecured end of the body half, for greater ease of finger-squeezing action upon the respective snap-fastener components, both for an engagement-developing and for an engagement-separating manipulation.

What is claimed is:

1. As an article of manufacture, a first porous substrate portion of unapertured flexible material having spaced first and second complementary snap-fastener components each of which is formed from a single charge of plastic material locally and in-situ molded to the same side of said substrate portion, said components being a socket component and a stud component which are sized for loose engageability to each other upon flexed folded manipulation of the material between said components, said engageability being characterized by a predetermined clearance relation between said components when in engaged relation; whereby, upon interposing between said components a second portion of unapertured flexible material of thickness comparable to said clearance and then engaging said components to each other via the interposed second portion of flexible material, a selectively engageable and secure coupling may be established between said portions.

2. The article of claim 1, in which said first and second portions are at opposite ends of a single elongate strip of said porous substrate material.

3. The article of claim 2, in which the end having said first portion is characterized, by a laterally offset tab having one of said snap-fastener components molded thereto, said components being engageable to each other via a selected interposed region of the other end of said strip.

4. A two-dimensional fabric article having spaced edges adapted to be drawn together in a wrap of the fabric around a body part, wherein the wrap is secured by at least one article of claim 1, said first substrate portion being so locally affixed to said fabric near one of said edges as to permit said flexed folded manipulation, and said second portion of flexible material being so locally affixed to said fabric near the other of said edges as to leave a free unaffixed length thereof for selective positioning between said snap-fastener components prior to snap-engagement of said components via said free unaffixed length.

5. The fabric article of claim 4, in which said first portion is a relatively short length of tape one end of which carries one of said components and is secured to said fabric and the other end of which carries the other of said components and is free of said fabric.

6. The fabric article of claim 5, in which said second portion is a length of tape wherein the unaffixed length substantially exceeds the length of said first portion.

7. The article of claim 1, wherein said first porous substrate is a strip of uniform width and length at least four times said width, the flexed folding being at half length to define integrally connected upper-tab and lower-body halves each of which is of length substantially twice the width, said snap-fastener components being molded within the outer-end half length of each of said halves, whereby said lower-body half is characterized by a fastener-free area of length at least equal to said width, said fastener-free area being adapted for attachment to a garment or the like fabric, whereby, when attached to a garment or the like fabric each of said snap-fastener components is manipulable independent of the garment or the like fabric.

8. A two-dimensional fabric article having spaced edges adapted to be drawn together in a wrap of the fabric around a body part, wherein the wrap is secured by at least one article of claim 1, said first substrate portion being so locally affixed to said fabric near one of said edges as to permit said flexed folded manipulation, said article being oriented to position the fold thereof at greatest offset from said one edge portion, and said second portion of flexible material being the other of said spaced edges, whereby said other-edge portion may be selectively positioned between said snap-fastener components prior to snap-engagement of said components via said other-edge portion.

9. A two-dimensional fabric article having spaced edges adapted to be drawn together in a wrap of the fabric around a body part, wherein the wrap is secured by two units of the article of claim 1, the first substrate portion of one of said units being so locally affixed to one side of said fabric near one of said edges as to permit said flexed folded manipulation, the first substrate portion of the other of said units being so locally affixed to the other side of said fabric near the other of said edges as to permit said flexed folded manipulation, said article units being oriented to position the respective folds thereof at greatest offset from their respective fabric edges and from each other, whereby said one unit may be snap-engaged to said other edge portion and said other unit may be snapengaged to said one edge portion.

10. The article of claim 1, in which said first substrate portion is of relatively stiffly flexible material, folded at a longitudinally central hinge crease, said snapfastener components being in self-piloting engageable relation when flat-folded at said hinge crease.

11. As an article of manufacture, first substrate portions of unapertured flexible material comprising two like rectangular pieces of length at least twice their width, first and second complementary snap-fastener components each of which is formed from a single charge of plastic material locally and in-situ molded to one side and near one end of a different one of said two pieces, said components being a socket component and a stud component which are sized for loose engageability to each other, said engageability being characterized by a predetermined clearance relation between said components when in engaged relation, and a fabric mounting to which the other end of each of said pieces is independently secured, in such orientation that said snap-fastener components are in confronting registration.

* * * * *